June 6, 1939.                R. A. BECWAR                2,161,736
                          AUTOMOBILE AERIAL
                          Filed May 19, 1937
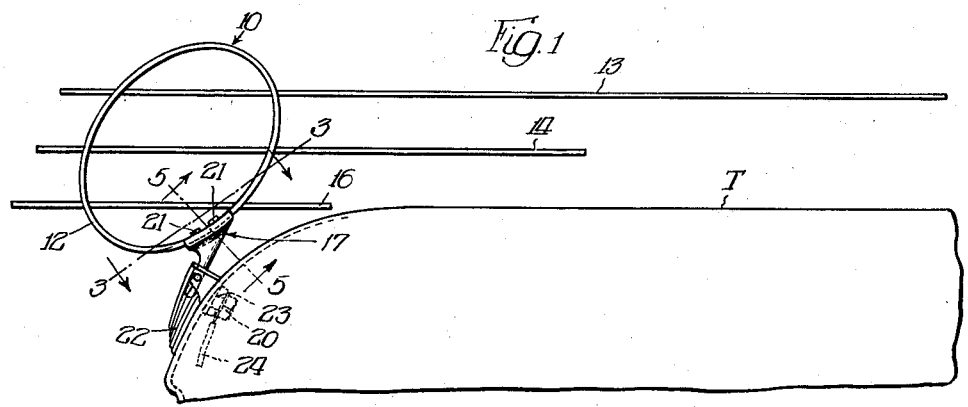
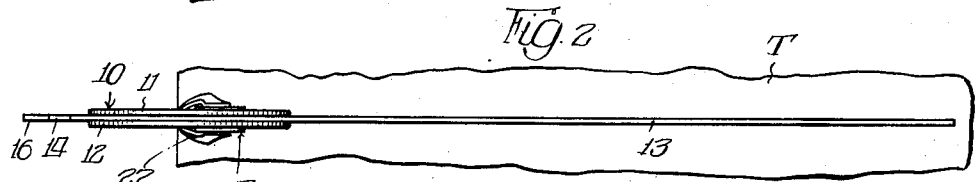
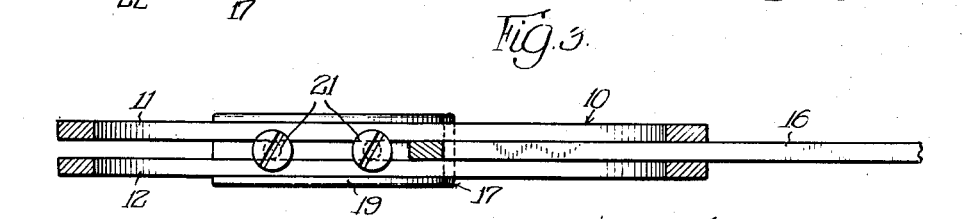
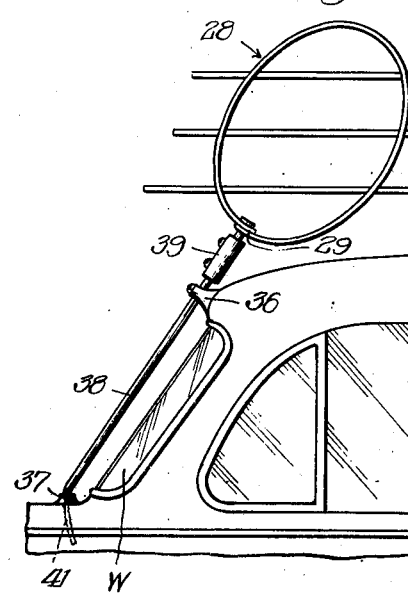
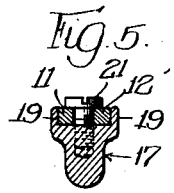
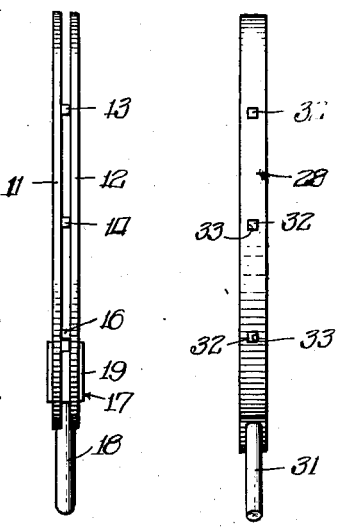
Inventor:
Rudolph A. Becwar,
By Foorman L. Mueller, Atty Patented June 6, 1939

2,161,736

UNITED STATES PATENT OFFICE 2,161,736

AUTOMOBILE AERIAL

Rudolph A. Becwar, Chicago, Ill., assignor to Galvin Manufacturing Corporation, Chicago, Ill., a corporation of Illinois Application May 19, 1937, Serial No. 143,527

4 Claims. (Cl. 250—33)

My invention relates to aerials for automobile radio receivers, and particularly to aerials for mounting on or at the top of an automobile for connection to a radio receiver in the automobile.

All-metal tops for automobiles have introduced numerous problems with respect to the operation of radio receivers for such automobiles. One of the most annoying problems is that of obtaining sufficient signal reception as free of interference as possible. In solving this problem, and to get a metal body in an aerial sufficient for the necessary signal pick-up on the top of an automobile, a relatively long rod has been mounted to stick up into the air away from the top. Aside from manufacturing problems with respect to such an aerial, it is objectionable from the standpoint of appearance and rigidity. Because of its height, it has been necessary to provide means to pull the rod down against the automobile top or similarly reduce its effective height so that the automobile may pass under bridges, under trees, into garages, and the like, without injuring the aerial, where the effective height of the passageway is less than the over-all height of the car and upwardly extending aerial. Some of the prior art devices remain extended, but are provided so flexible that they may bend in every direction without breaking. These, however, have not proven satisfactory.

An object of my invention is to provide an improved aerial for an automobile radio receiver.

A further object is to provide such an aerial in a rigid, sturdy construction which may be readily and safely mounted at the top of an automobile to provide a large effective aerial surface for radio signal reception, and present a neat and artistic appearance.

A still further object of the invention is to provide a simple, inexpensive device which may be mounted adjustably at the top of an automobile so that its position with respect to the auto top may be varied to vary the appearance to suit the user's or operator's own artistic tastes.

One of the features of the invention is the provision of an aerial of inexpensive material and of such structure that the several parts may be quickly and cheaply assembled.

Other objects and features of the invention will be apparent from the following description, taken with the drawing, in which:

Fig. 1 is a side elevation showing a fragmentary portion of an automobile top with the aerial of my invention mounted thereon.

Fig. 2 is a top plan view of the structure of Fig. 1.

Fig. 3 is a sectional view along the line 3—3 of Fig. 1.

Fig. 4 is a front elevation of the structure of Fig. 1.

Fig. 5 is a cross-sectional view of the aerial bracket of Fig. 1, along the line 5—5 thereof.

Fig. 6 is a side elevation of a modified embodiment of the antenna structure itself on a modified mounting bracket, as contrasted to the top mounting bracket of Fig. 1. It is understood that the antenna structure of Figs. 1 and 6 may be mounted in either of the auto top brackets illustrated.

Fig. 7 is a front elevation of the antenna of Fig. 6, alone.

In practicing the invention, an open, relatively thin aerial framework is provided, which is substantially non-wind-resistant, has a relatively large amount of metal surface, is extremely sturdy, and with all these characteristics, still retains a very pleasing and artistic appearance. The frame is removably mounted in a bracket secured to the top or to the top and body of the automobile, with provisions for a lead-in wire to the radio receiver therefrom. To increase the metal surface of the aerial and to improve its artistic appearance, as well as its utility, a plurality of bars, rods or wires, are rigidly secured to the open frame in spaced-apart relation to extend rearwardly over the auto top and supply the appearance of speed to the entire device. These members are relatively thin, and, like the frame, are substantially non-wind-resistant.

In the preferred embodiment illustrated in Fig. 1, an elliptical or oval frame 10 is provided, consisting of a pair of elliptical rings 11 and 12 of identical shape and size. The rings may be preferably formed from square metal stock and welded or otherwise secured at their ends to form a continuous frame. To increase the metal surface of the aerial for the desired radio signal pick-up, a plurality of elongated bars 13, 14 and 16 are spot welded or otherwise secured intermediate the two elliptical rings 11 and 12, as shown in Figs. 1 to 4. The three bars, as illustrated, are of varying lengths, so as to give a more desirable artistic effect to the aerial as a whole, and with the placement of the bars from the shortest at the bottom to the longest at the top giving an appearance of speed, which blends very nicely with the streamlined body effects on the present day automobiles.

Although three bars have provided a very satisfactory device in the commercial embodiment of the invention, it is understood that this number may be varied, and it is also understood that the placement of the bars from the shortest at the bottom to the longest at the top may be varied as desired.

The aerial may be assembled by placing the rings and straight rods into a jig and then spot welding the various pieces together. In this assembly the rings themselves are first formed to an elliptical or oval shape, with the ends of the bars or rods from which they are formed, butt-welded together.

A simplified and adjustable mounting bracket is provided in the member 17, which comprises a one-piece die-cast bracket with a mounting stem 18 and a channelled body portion 19. The bottom of the channel and sides thereof correspond in contour to the shape of the frame, in this instance elliptical or oval, and are of such a size that the bi-part frame fits snugly but movably therein. In the commercial embodiment of the invention, the rings 11 and 12 are spaced far enough apart so that there is sufficient clearance for 6/32 screws 21, as shown in Figs. 1 and 3. The head of each of the screws bears against the inside surface of the oval rings, and the screw portion is threadably secured in the body portion of the bracket 17. The aerial frame can be adjustably moved in the bracket 17 when mounted on the top of the car, by merely loosening the screws 21. Inasmuch as the bracket is secured to the frame at the lower portion thereof, little movement of the frame is required to move the tail end of the elongated bars up or down to suit the fancy of the operator. Furthermore, with the aerial extending forwardly from the top of the automobile on the mounting bracket, and thus away from said top, increased signal pick-up is accomplished for better performance of the radio receiver.

The aerial may be desirably mounted in an insulating bracket 22 secured to the front of the auto top T by means of a bolt 20 extending therethrough, and having a nut 23 on the end thereof. The stem 18 of the bracket 17 is in electrical connection with the bolt 20 of the bracket 22, and a lead-in wire 24 extends from the bolt to the radio receiver mounted in the automobile.

A modified embodiment of the invention is illustrated in Figs. 6 and 7. This includes a one-piece oval or elliptical frame 28 in a band substantially as wide as the over-all width of the frame 10, with its ends welded together or otherwise secured at 29 to provide a continuous path over the entire frame. A mounting stud 31 desirably extends through the two ends of the frame at 29 and is peened over to remain rigidly on said frame for mounting the latter in an appropriate bracket as shown in Fig. 6. This embodiment includes a plurality of metal bars or rods 32 of the same lengths, and spaced in the same design if desired, as the rods 13, 14 and 16 of Fig. 1. The bars or rods 32 are mounted on the frame 28 by extending them through apertures 33 therein where they are soldered or spot welded to the frame to rigidly secure them thereto.

As previously explained, the embodiment of the aerial shown in Fig. 1, and the embodiment shown in Fig. 6, may be mounted in the brackets with which they are illustrated in these figures, or they may be changed from one to the other. The mounting bracket of Fig. 6 includes an apertured bracket 36 secured to the roof of the automobile above the windshield W, and a bushing 37 secured below the windshield to support therebetween an elongated hollow rod 38 mounted in the bushing 37 at the bottom and having an insulator coupling bushing 39 at the top. A lead-in wire 41 extending through the hollow rod 38 engages the mounting pin 31 of the aerial in the coupling 39 for electrical connection therewith, to carry the radio signals from the aerial to the receiver in the automobile.

It is thus seen that the invention provides a sturdy auto top aerial which may be readily mounted on an automobile and carried thereon to provide for a large amount of signal pick-up and at the same time give a pleasing and artistic appearance to the automobile as a whole.

Although the invention has been illustrated in in its preferred embodiments, it is understood that it is not limited thereby, but is limited only by the scope of the appended claims.

I claim:

1. A fabricated antenna for mounting on the top of an automobile to extend relatively high above the top and extend at such height longitudinally of the automobile comprising a pair of coaxial relatively open frame members each lying substantially in a single vertical plane with said planes parallel to one another but spaced apart laterally, a plurality of elongated bars spaced apart from one another and lying intermediate said frame members and each in engagement therewith in at least two oppositely disposed points on said frame members, with said bars each extending longitudinally from the frame members at one of said engaging points for each bar, and means for permanently securing said bars to each frame member and thereby securing said frame members permanently with respect to one another to provide a rigid antenna frame structure and mounting means for said frame structure including an insulating portion for directly mounting on the automobile top, and a channelled portion for receiving said frame structure, and threaded means extending through said frame structure and into said mounting means to rigidly secure the frame structure thereon.

2. An automobile roof antenna provided for ease of original fabrication and subsequent rigidity in mounting and use comprising a metal frame member, standing in a vertical plane, a plurality of spaced apart elongated metal elements rigidly secured to said frame, with each of said elements engaging such frame in at least two separated points, with said member and frame rigidly and permanently secured together at said points to provide a completely rigid antenna structure and with said metal elements extending forwardly and rearwardly from each of said engaging points in a plane parallel to the plane of the frame member to provide an enlarged metal signal-receiving surface in said antenna and mounting means for said frame member including an insulating portion for mounting directly on the automobile roof, and a channelled portion for receiving said frame member, and threaded means extending from one side of said frame member to the other side thereof and into said mounting means to rigidly secure the frame member thereon.

3. Antenna apparatus for mounting on an automobile comprising in combination a relatively open signal-receiving metal frame and a mounting bracket for said frame, said frame comprising a pair of complementary open members standing in a pair of vertical parallel planes spaced laterally from one another, an elongated rod intermediate said members in engagement therewith in at least two spaced apart points with said rod permanently secured to each member at said engaging points to secure said members in permanent relation with respect to one another and provide with said rod a rigid expansive frame structure, said bracket having a channel therein corresponding to the lateral width of said frame for receiving said members at one portion thereof, a headed screw threadably secured in said channel with its shank lying intermediate said members and adapted to be screwed into said bracket to cause the head to engage the inside surface of the mounted portion of each of the members to press the members against the bottom of the channel to provide a simple and rapid assembly for the frame and bracket and insulating means for said bracket for mounting directly onto the automobile.

4. Antenna apparatus for mounting on an automobile, comprising in combination a relatively open vertically-positioned signal-receiving metal frame and mounting means for said frame, said frame comprising a member standing in a vertical plane, an elongated substantially horizontally horizontally extending rod secured to said member in at least two oppositely disposed spaced apart points to secure said rod and said member in permanent relation with respect to one another, said mounting means including a portion carrying said member in engagement therewith and corresponding to a portion of the outer contour of said member at the engaged surface of said portion, a pair of threaded means extending from one side of the member to the other and into said mounting means to rigidly clamp said member on said portion but clamp the same in a manner to permit an angular adjustment of said member with reference to said portion so as to vary the mounted-position angular relationship between said rod and the automobile, and said mounting means including an insulating portion for directly engaging the automobile and mounting said apparatus thereon.

RUDOLPH A. BECWAR.